United States Patent
Trieu et al.

[11] Patent Number: 5,925,135
[45] Date of Patent: Jul. 20, 1999

[54] CLOCK RATE COMPENSATION FOR A LOW FREQUENCY SLAVE DEVICE

[75] Inventors: Tuong Trieu, Folsom; James P. Kardach, Saratoga, both of Calif.

[73] Assignee: Intel Corporation, Santa Clara, Calif.

[21] Appl. No.: 08/721,234

[22] Filed: Sep. 26, 1996

Related U.S. Application Data

[51] Int. Cl.⁶ ...................................................... G06F 1/04
[52] U.S. Cl. ............................................. 713/400; 713/503
[58] Field of Search .................................... 395/551, 552, 395/555, 556, 558, 559, 560, 306, 309

[56] References Cited

U.S. PATENT DOCUMENTS

| | | | |
|---|---|---|---|
| 5,371,880 | 12/1994 | Bhattacharya | 395/551 |
| 5,696,994 | 12/1997 | Pang | 395/884 |

OTHER PUBLICATIONS

*Programmable Logic Devices, Data Handbook*, Phillips Semiconductors, (1993), pp. 689–709.

Primary Examiner—Dennis M. Butler
Attorney, Agent, or Firm—Jeffrey S. Draeger

[57] ABSTRACT

A slave device having clock rate compensation circuitry for low frequency operation. The slave device is coupled to a bus having a first operating frequency yet uses a slave clock signal having a frequency less than the first operating frequency. The slave device includes a bus clock driver circuit coupled to a bus clock interface for a bus clock signal. A slave controller state machine is clocked by the slave clock signal and accordingly operates at less than the first operating frequency. The clock rate compensation circuitry receives the bus clock signal, a data signal, and the slave clock signal, and synchronizes bus events for the state machine. The clock rate compensation circuitry also asynchronously begins a bus clock signal stretching period.

28 Claims, 5 Drawing Sheets

CLOCK RATE COMPENSATION FOR A LOW FREQUENCY SLAVE DEVICE

FIELD OF THE INVENTION

The present invention pertains to the field of interfacing devices to a bus in a computer system. More specifically, the present invention pertains to interfacing a low frequency device to a bus having at least one other device operating at a higher frequency.

BACKGROUND

While operating frequencies of many devices in intelligent electronic systems continually increase in response to demands for greater computational power, avoiding high frequency clocks may be prudent in some circumstances. For example, a low frequency clock may be appropriate in a power consumption sensitive application since power dissipation can be reduced by using lower frequencies. Unfortunately, low frequency operation delivers low performance and thus is typically either limited to periods when performance is secondary to power consumption or to functions which are not computationally intensive.

Serial buses performing system management functions are prime candidates for low frequency operation. Such serial buses are employed in computer systems and other intelligent electronic devices such as audio equipment, video equipment, smart batteries, and smart battery chargers. Generally, these buses transmit system control commands and data between various devices on the bus at relatively low frequencies (e.g., 10–100 kHZ).

Some well known serial buses are the Inter-Integrated Circuit ($I^2C$) Bus, the ACCESS.bus, and the System Management Bus (SMBus). The $I^2C$ bus was developed by Philips Corporation. The ACCESS.bus, an open industry standard which evolved from $I^2C$ technology, provides a low-cost serial bus allowing control of various computer system devices and internal resources. The ACCESS.bus specification more fully describes the ACCESS.bus and is available from the ACCESS.bus Industry Group in Sunnyvale, Calif.

The ACCESS.bus now also supports the features of another similar serial bus, the SMBus. The SMBus aims to provide intelligent computer system power management by allowing two-way communication for attached devices. For example, intelligent batteries notify users of remaining power and charge requirements and send warnings before failure. Users or system software can respond by adjusting levels of power consumption. Further details of the SMBus are documented in the System Management Bus Specification available from Intel Corporation of Santa Clara, Calif.

Whether attached to an $I^2C$ bus, an ACCESS.bus, a SMBus, or other bus, devices generally fall into the general categories of master, slave, and host. A device which gains control of the bus and transmits information is a master device. The master device drives a bus clock signal which functions as a strobe, allowing data to be transferred when the bus clock is driven to a low logic level. An open drain driver for the bus clock signal allows other devices to hold the clock signal at this logic level after the master has released it, thereby extending the time available to sample data driven on the bus. The open drain nature of the clock signal does not allow stretching of other events such as start and stop events because they occur when the bus clock is at a high logic level.

A device receiving the transmitted information and potentially stretching the bus clock signal is referred to as a slave device. Each device may have master and slave capabilities, or may remain exclusively a slave device. A serial bus also typically has one host device which communicates with a central processor. This host device has an associated slave port and slave controller allowing the host device to receive commands from other devices on the serial bus. For example, a SMBus host device may receive, from a smart battery, a command to awaken the computer system from a low power suspend mode.

Such data transmissions are generally constrained to a specified frequency range or a specified maximum frequency. Each bus master operates within the specified parameters but transfers data sequences according to its own operating frequency. Thus, in order to maintain compatibility with all possible bus masters, slave devices must be able interpret data sequences that may vary in frequency up to the specified maximum bus frequency.

As a consequence, prior art devices implement slave controller circuits using synchronous logic capable of interpreting signals at the specified maximum frequency. This requires a sampling frequency of at least the rate of information transfer, thus forcing prior art controllers to have an operating frequency at or above the maximum frequency expected to be encountered on the bus.

This operating frequency limitation presents a significant barrier to power conservation, one of the primary goals of serial buses such as the SMBus. The frequency limitation also reduces hardware flexibility by limiting the choice of clocks suitable for clocking slave controller logic. In sum, prior art serial bus interface logic requires high operational frequencies causing additional power consumption and precluding hardware efficiencies which may otherwise be achieved through the use of existing clock signals.

SUMMARY

The present disclosure describes a slave device having clock rate compensation circuitry for low frequency operation. The slave device is coupled to a bus having a first operating frequency yet uses a slave clock signal having a frequency less than the first operating frequency. The slave device includes a bus clock driver circuit coupled to a bus clock interface for a bus clock signal. A slave controller state machine is clocked by the slave clock signal and accordingly operates at less than the first operating frequency. The clock rate compensation circuitry receives the bus clock signal, a data signal, and the slave clock signal, and synchronizes bus events for the state machine. The clock rate compensation circuitry also asynchronously begins a bus clock signal stretching period.

BRIEF DESCRIPTION OF THE FIGURES

The present invention is illustrated by way of example and not limitation in the Figures of the accompanying drawings.

DETAILED DESCRIPTION

The present invention provides a clock rate compensation for a low frequency slave device. In the following description, numerous specific details such as particular bus protocols, signal names, and circuit level implementations are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

The described methods and apparatus compensate for a slave device having an operating frequency less than other devices on a shared bus. These techniques are generally applicable to a wide variety of buses, either serial or parallel, provided that a clock or strobe signal may be stretched in a first logic state and that a limited variety and/or sequence of events occurs in a second logic state.

Under these circumstances, the present invention allows the slave device to maintain compatibility with other devices having higher operating frequencies. Consequently, power may be conserved by using lower frequency clocks and hardware savings may result due to reduced clocking constraints. In one computer system which is illustrated in FIG. 1, the present invention allows a slave controller to be clocked by the continuously active real time clock when the computer system is in a low power suspend mode.

Figure 1:
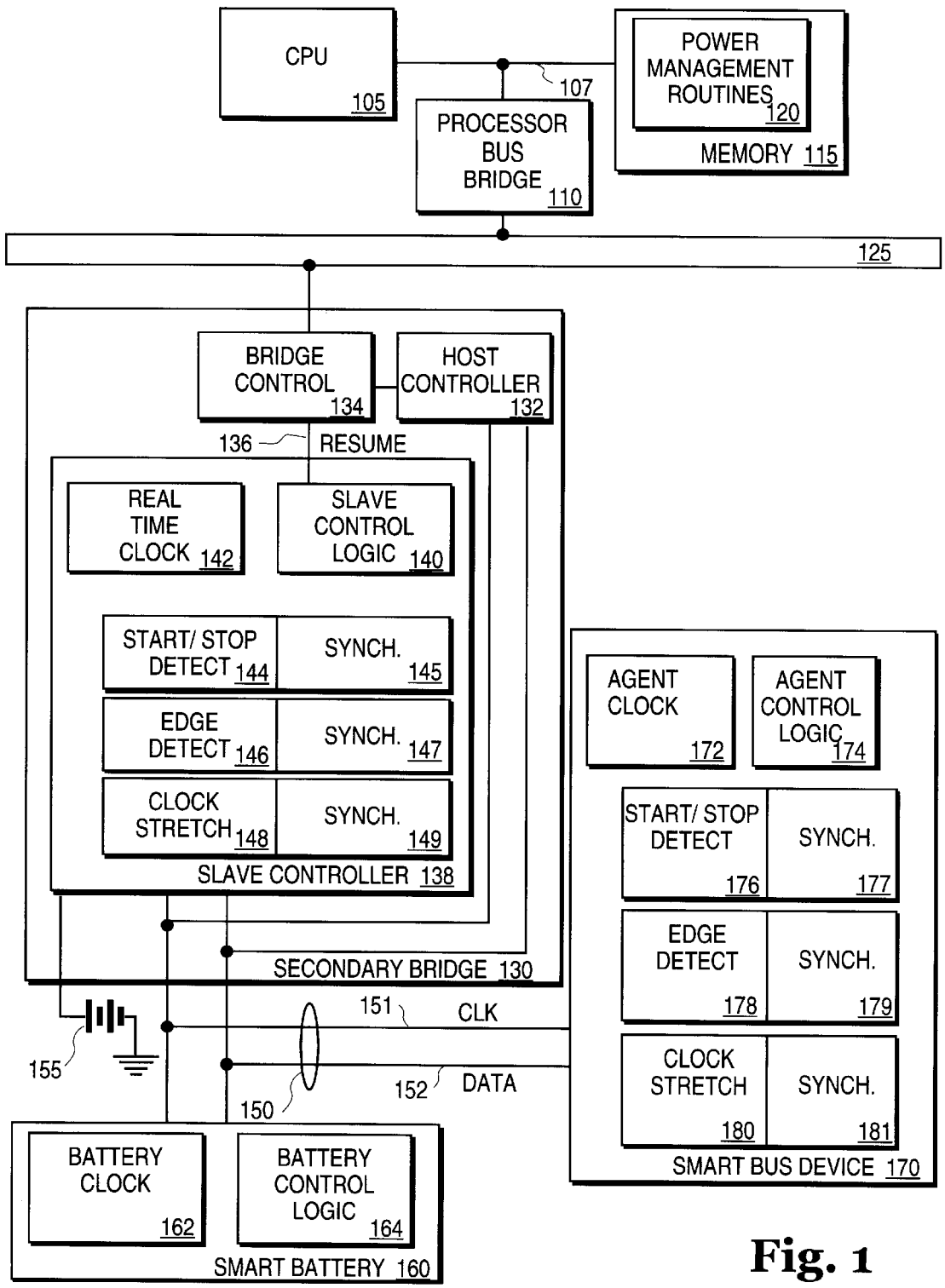
FIG. 1 illustrates one embodiment of a computer system of the present invention.

The computer system of FIG. 1 includes a processor 105 coupled by a processor bus 107 to a memory 115 which contains power management routines 120. A processor bus bridge 110 couples the processor bus 107 to a system bus 125, allowing interaction between processor bus devices and system bus devices. Many other processor, lo memory, and system bus arrangements are well known and could be substituted for those shown.

A secondary bridge 130 couples the system bus 125 to a secondary bus, in this case a serial bus 150 for a clock signal (CLK) 151 and a data signal (DATA) 152. The secondary bridge 130 may also be integrated with logic which couples the system bus 125 to an expansion bus (not shown) such as an EISA or ISA bus.

The secondary bridge 130 includes bridge control logic 134, a host controller 132, and a slave controller 138. Bridge control logic 134 provides to the host controller 132 data and/or instructions from the system bus 125. The bridge control logic 134 also transfers data or interrupt signals from the host controller 132 or the slave controller 138 to the system bus 125.

The slave controller 138 includes a real time clock 142 which is powered by a battery 155. The battery 155 is typically a battery separate from a system power supply (not shown) because the real time clock 142 requires a continuous power supply. Since the slave controller 138 operates based on the real time clock 142, the slave controller 138 can remain operative even when the processor 105, the processor bus bridge 110, and/or other computer system components have been shut down.

This allows the slave controller 138 to process any data sequences which may arrive on the serial bus 150.

Slave control logic 140 conducts operation of the slave controller 138 in accordance with the protocol of the serial bus 150. The slave control logic 140 is clocked by a slave clock signal which is derived from the real time clock signal. The exact frequency may vary in different embodiments; however, the frequency of the slave clock signal is less than a maximum operating frequency specified for devices on the serial bus 150, thus necessitating event detection and synchronization logic as provided in the slave controller 138.

The event detection logic includes a start/stop detect circuit 144 for detecting start and stop events which occur when the clock signal is high and the serial bus data signal transitions. Additionally, edge detect logic 146 detects a rising edge on the clock signal of the serial bus 150, and clock stretch logic 148 detects a falling edge of the clock signal and immediately begins to stretch the low clock period in order for the slave control logic to properly respond to the forthcoming data. Events detected by the start/stop detect circuit 144, the edge detect logic 146, and the clock stretch logic 148 are synchronized to the slave clock signal domain by synchronizer circuits 145, 147, and 149 respectively.

In the illustrated embodiment, serial bus events detected by the slave controller may originate from a smart battery 160 or another smart bus device 170. The smart battery 160 has a battery clock 162 and battery control logic 164. In the case where the battery clock 162 is faster than the slave clock signal, the event detection and synchronization logic of the slave controller 138 is critical in allowing the slave control logic 140 to properly process events driven to the serial bus 150 by the smart battery 160.

Similarly, smart bus device 170 requires clock rate compensation circuitry if the battery clock 162 is faster than an agent clock 172. Thus, the smart bus device 170 includes a start/stop detect circuit 176, edge detect logic 178, and clock stretch logic 180. Synchronizer circuits, 177, 179, and 181 respectively couple signals from these circuits to agent control logic 174. In one embodiment, the smart bus device 170 is a battery charger used to charge the smart battery 160.

Other devices could be coupled to the serial bus 150 and may or may not require clock rate compensation circuitry. Any device including slave capabilities and having a controlling clock signal with a frequency less than a maximum frequency expected on the serial bus 150 should include clock rate compensation circuitry to maintain compatibility with all possible devices which may be coupled to the serial bus 150. The use of a low frequency clock may be advantageous not only for power savings, but also in that it allows existing hardware (i.e., real time clock 142) to be leveraged to simplify the overall system.

With the illustrated arrangement only the real time clock needs to remain active in order to monitor events on the serial bus 150 when the computer system is in a low power state. Accordingly, the slave controller 138 can receive a data sequence from a device on the serial bus 150 such as the smart battery 160 and assert a resume line 136, eventually causing the computer system to wake up and execute one of the power management routines.

Figure 2:
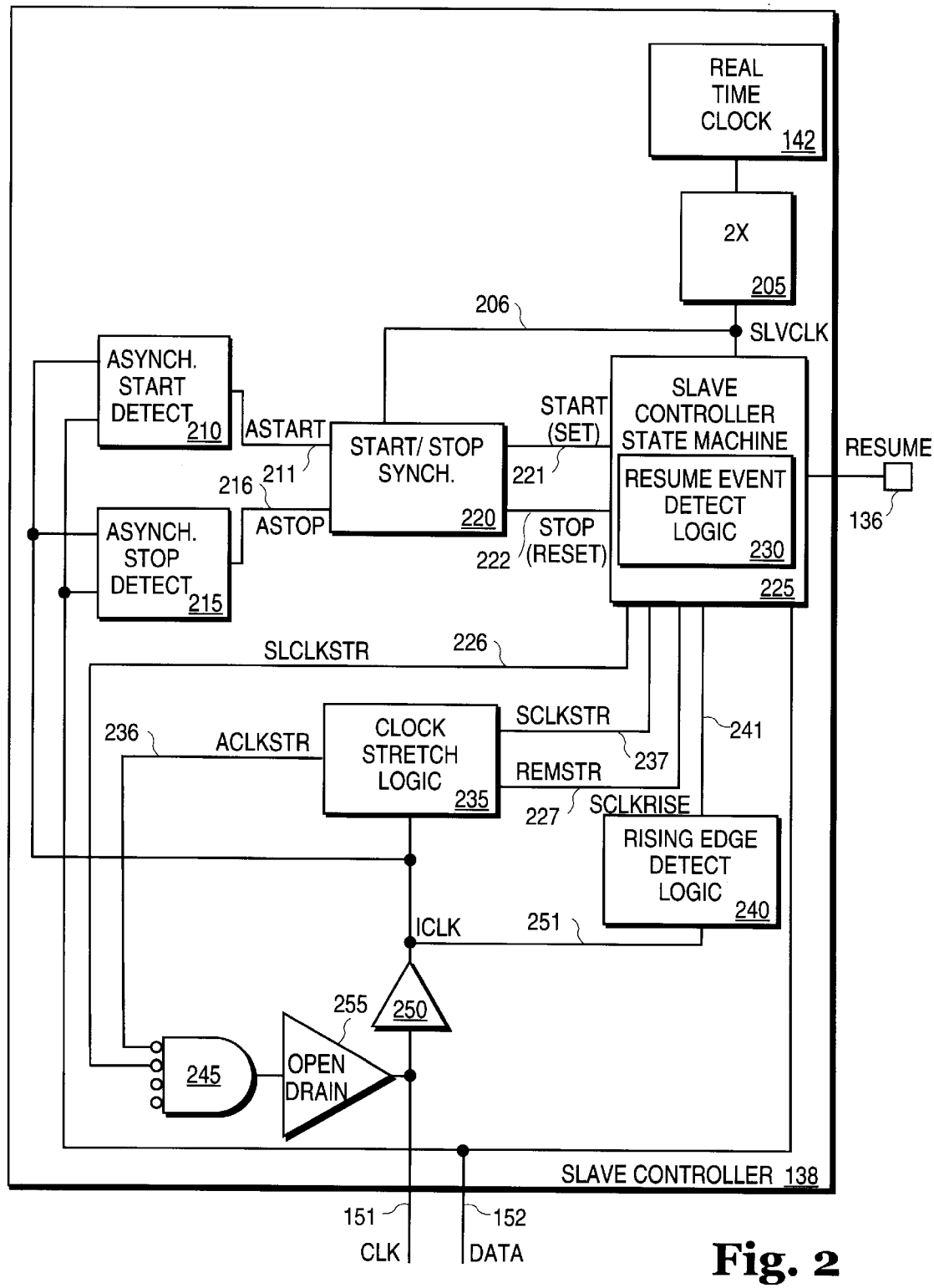
FIG. 2 illustrates details of one embodiment of the slave controller pictured in FIG. 1.

FIG. 2 illustrates further details of the slave controller 138. In the illustrated embodiment, the real time clock 142 is coupled to a clock multiplier circuit 205 to generate the slave clock signal (SLVCLK) 206. A synchronous state machine clocked by SLVCLK 206, slave controller state machine 225, receives and processes commands and data from the serial bus 150. The state machine 225 also includes resume event detect logic 230 which generates a resume signal when a received data sequence indicates that the computer system should be awakened. While the implementation of the state machine 225 may vary substantially depending on the protocol of the serial bus, proper clock rate compensation circuitry remains crucial in interfacing the state machine 225 with the faster domain of the serial bus.

A bus clock driver circuit, open drain driver 255, is coupled to a bus clock interface to drive the bus clock signal (CLK) 151 to the serial bus 150 illustrated in FIG. 1. This open drain driver 255, as previously mentioned, allows CLK 151 to be stretched in its low logic state because the signal is only strongly driven to the low logic level. An embodiment having different polarities for the clock and other signals is within the scope of this invention.

The remaining circuitry shown is clock rate compensation circuitry which is coupled to detect and synchronize bus events for the state machine and to asynchronously begin a bus clock signal stretching period upon receipt of a falling edge of the bus clock signal. The falling edge of CLK is reflected on an internal clock signal (ICLK) 251 by an input buffer 250. In response, clock stretch logic 235 generates an asynchronous clock stretch signal (ACLKSTR) 236 for the driver 255. The open drain driver 255 receives ACLKSTR 236 through an AND gate 245 and drives CLK 151 low, thus beginning the clock stretching period. The clock stretch logic 235 synchronizes ACLKSTR 236 and generates a synchronized slave clock stretch signal (SCLKSTR) 237, a clock stretch signal synchronized to SLVCLK 206. After receiving SCLKSTR 237, the state machine 225 controls when the clock stretching period is terminated. Such control allows the state machine 225 to capture data or otherwise properly respond according to the protocol of the serial bus.

In order to assure that CLK 151 is not inadvertently released prior to the intended termination of the clock stretching period, the slave controller 138 employs overlapping mechanisms to sustain the clock stretching. First, the clock stretch logic 235 asserts ACLKSTR 236 and generates SCLKSTR 237. The state machine 225 responsively generates a slave stretch clock signal (SLCLKSTR) 226 which is coupled to the open drain driver 255 via the AND gate 245. Subsequently, the clock stretch logic 235 is reset by a remove stretch signal (REMSTR) 227 from the state machine, but not before an overlapping window of SLCLKSTR 226 and ACLKSTR 236 assures the continuity of the clock stretching period.

The result is that the asynchronous falling clock edge is synchronized and CLK 151 is stretched. This allows the state machine to receive a data item from the serial bus in compliance with the serial bus protocol. CLK 151 is released (SLCLKSTR 226 deasserted) and the clock stretching period terminated in a synchronous fashion when the state machine 225 has performed the appropriate acts. Since the clock stretch circuit 235 has been reset, the clock rate compensation circuitry is immediately ready for the next event.

Typically the bus clock next transitions to the high logic level. This transition must be detected and synchronized to the slave clock signal domain for the slave controller state machine 225 to properly transition between states. Accordingly, rising edge detect logic 240 receives both ICLK 251 and SLVCLK 206, and responsively generates a synchronous clock rise signal (SCLKRISE) 241 which is coupled to the state machine 225.

Although the high clock phase cannot be stretched, the clock rate compensation circuitry of the present invention ensures that the state machine can process the detected rising CLK edge. This is necessary to prevent a faster bus master from pulsing CLK 151 again prior to the state machine 225 recognizing the CLK 151 rise transition. Accordingly, the clock stretch logic 235 stretches CLK 151 when it transitions low, effectively adding wait states for the faster bus master and preventing CLK 151 from again transitioning high until the state machine 225 can process the detected rising CLK edge. Additionally, such clock stretching provides an opportunity to synchronize a limited sequence of events occurring while CLK 151 is high.

In the illustrated embodiment, the limited sequence of events occurring while CLK 151 is high includes start and stop events. A high to low transition on the data signal when CLK 151 is high constitutes a start event, whereas a low to high transition when CLK 151 is high is a stop event. An asynchronous start detect circuit 210 is coupled to receive ICLK 251 and DATA 152. The asynchronous start detect circuit 210 generates an asynchronous start signal (ASTART) 211 when a high to low transition of DATA 152 is detected and ICLK 251 is high. Similarly, an asynchronous stop detect circuit 215 is coupled to receive ICLK 251 and DATA 152 and generates an asynchronous stop signal (ASTOP) 216 in response to a low to high transition on DATA 152 when ICLK 251 is high.

A start/stop synchronizer 220 is coupled to receive ASTART 211, ASTOP 216, and SLVCLK 206. The start/stop synchronizer 220 generates a synchronous start signal (START) 221 and a synchronous stop signal (STOP) 222. Collectively, the asynchronous start detect circuit 210, the asynchronous stop detect circuit 215, and the start/stop synchronizer 220 form start/stop detection and synchronization logic which preserves a temporal relation between received the start and stop events in a deassertion edge of the synchronous start signal or the synchronous stop signal. The state machine 225 accordingly sees a start and stop sequence which ends synchronously and reflects the actual order in which the events occurred.

Figure 3:
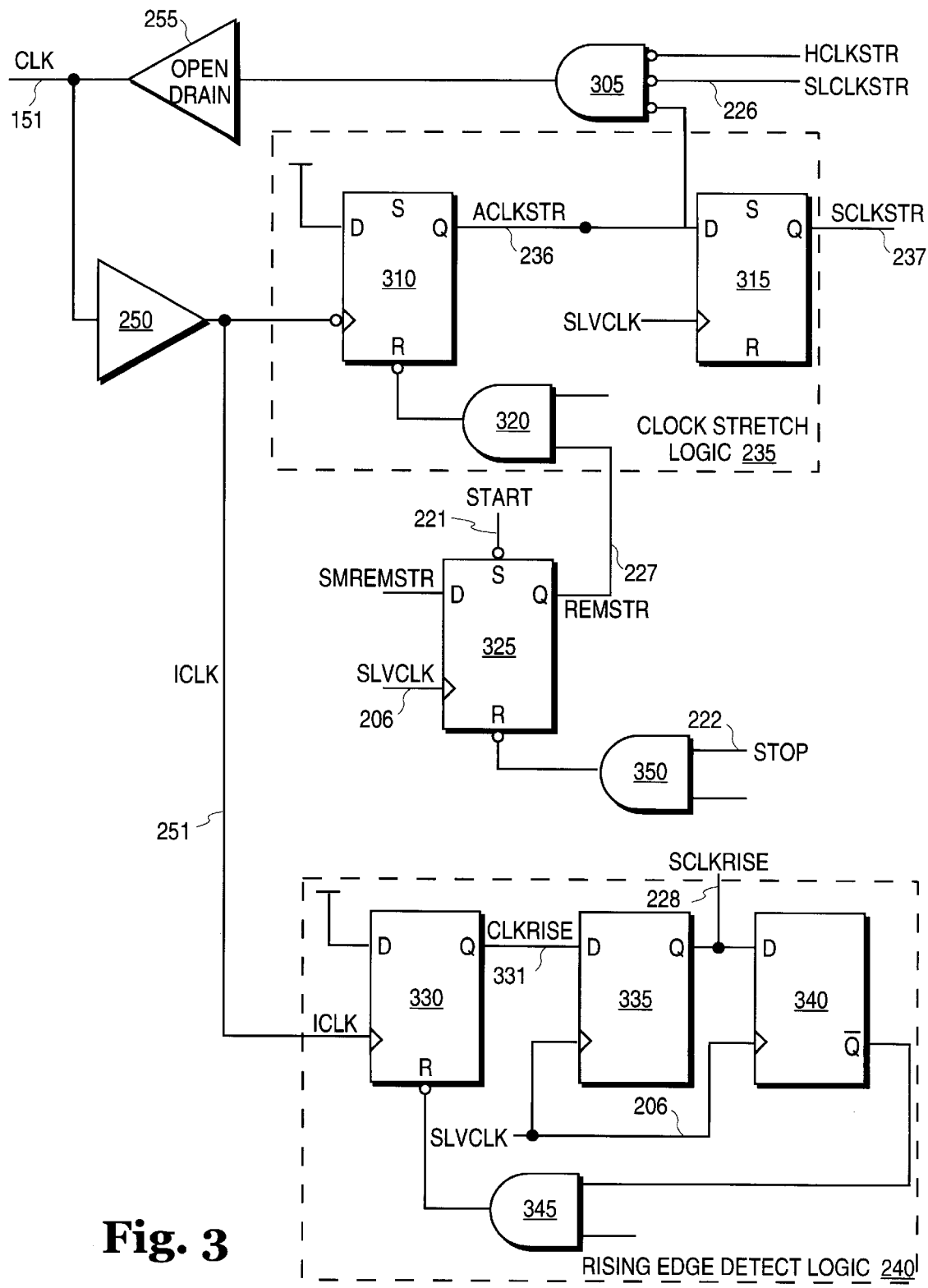
FIG. 3 illustrates one embodiment of the clock stretch logic and the rising edge detect logic shown in FIG. 2.

Further details of the clock stretch logic 235 and the rising edge detect logic 240 are shown in FIG. 3. The clock stretch logic 235 includes a first latch 310, a second latch 315, and an AND gate 320. The first latch 310 has a data input and a clock input coupled such that the first latch 310 generates ACLKSTR 236 at a latch output when a falling edge is received on ICLK 251. In this case, the data input receives a logical one value at all times, the latch output is directly coupled to the asynchronous clock stretch signal line, and the clock input triggers the latch 310 to capture the value at the data input when a falling clock edge is received. The first latch 310 also has a reset input which is coupled to receive the remove stretch signal (REMSTR) 227 from the state machine 225 through the AND gate 320.

FIG. 3 also illustrates additional details showing how REMSTR 227 is generated by the state machine 225. A latch 325, which generates REMSTR 227, has set and reset inputs respectively coupled to the start and stop signals 221 and 222 from the start/stop synchronizer 220. The stop signal 222 is coupled to the reset input by an AND gate 350. The latch 325 also has a data input coupled to a state machine remove stretch (SMREMSTR) signal, and a clock input coupled to receive the slave clock signal. Normally, the clock stretching is removed by the state machine 225 using the SMREMSTR signal when the state machine 225 finishes processing data received while CLK 151 is low; however, when start or stop events occur, the latch 325 is asynchronously set or reset by the assertion of respectively either START 221 or STOP 222. This not only assures that the clock stretch logic 235 is ready when a start event occurs, but also prevents the clock stretch logic 235 from interfering with the bus clock signal 151 after a stop event.

The resulting asynchronous clock stretch signal 236 from the first latch 310 is coupled by an AND gate 305 to the open drain driver 255. Other inputs to the AND gate 305 include the previously discussed slave clock stretch signal 226 and a host clock stretch (HCLKSTR) signal. The host clock stretch signal allows the host controller 132 to stretch CLK 151 similarly to the way the slave controller stretches CLK 151, accommodating low frequency host controller 132 operation.

As is the clock stretch logic 235, the rising edge detect logic 240 is coupled to receive ICLK 251. The rising edge detect logic 240 includes a first latch 330 coupled to receive ICLK 251 and generate a clock rise (CLKRISE) signal 331 in response to a rising transition of CLK 151. A second latch 335 receives CLKRISE 331 and SLVCLK 206 and drives the synchronized clock rise signal (SCLKRISE) 228. A third latch 340 is coupled to receive SCLKRISE 228 and has an output coupled to reset the first latch 330 via an AND gate 345. Both the second latch 335 and the third latch 340 are clocked by SLVCLK 206 and thereby provide synchronization to the slave clock domain. Each of the AND gate 350, AND gate 320 and the AND gate 345 have an additional input allowing their respective latches to be reset by other events such as a power-on reset signal or a system reset signal.

In this particular embodiment, resetting of the rising edge detect logic 240 is accomplished locally by the latch 340 without receiving input from the state machine 225. This self-resetting scheme allows the same rise edge detect circuit to be shared by both the host and slave controllers, but requires the state machines to process SCLKRISE 228 as soon as this signal is asserted. In an alternate embodiment where reducing gate count is not a primary concern, the state machine 225 resets the rising edge detect logic 240 instead of the latch 340. This implementation improves slave state machine flexibility by eliminating the need to immediately process SCLKRISE 228.

Figure 4:
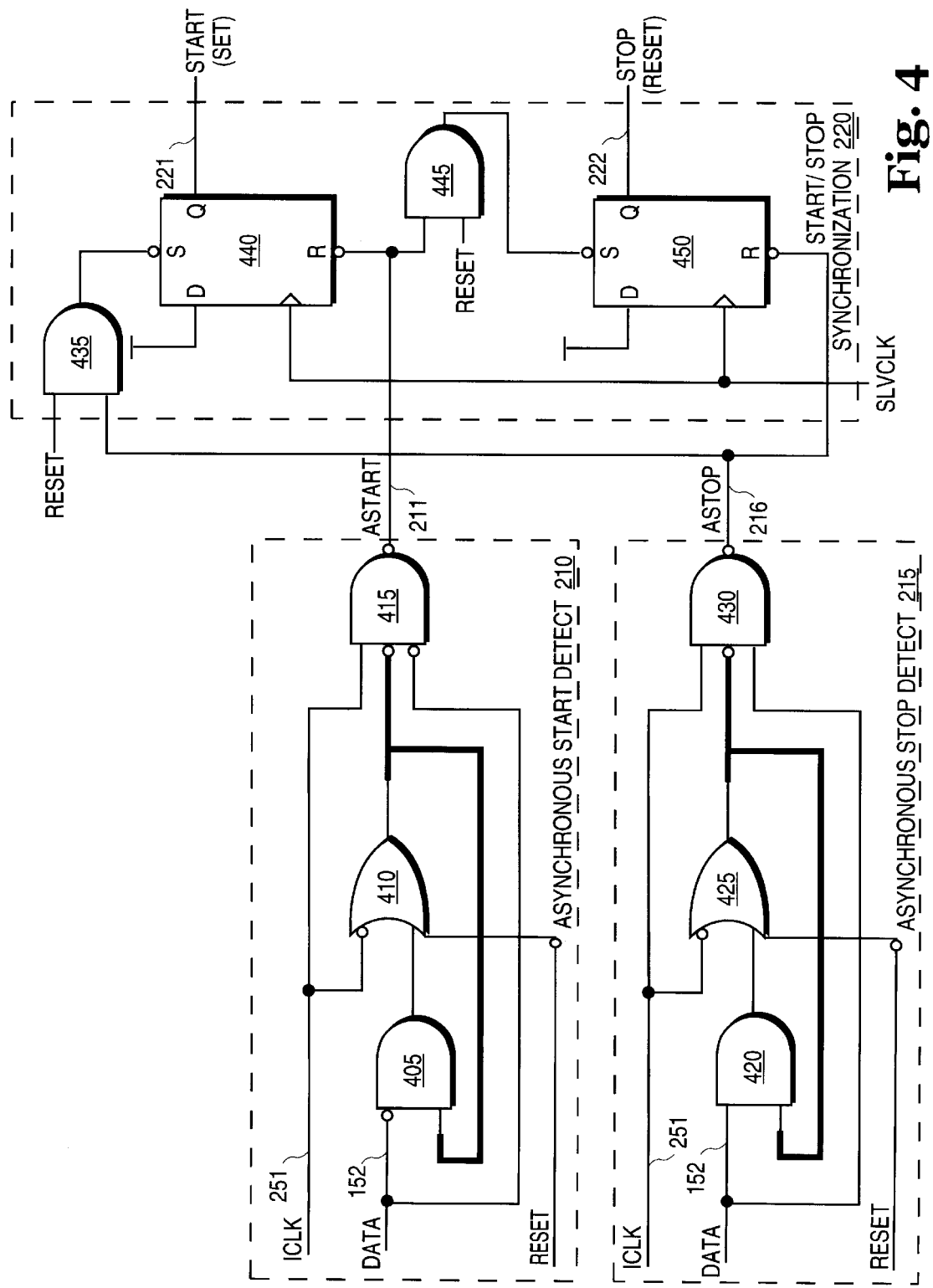
FIG. 4 illustrates one embodiment of the asynchronous start and stop detectors as well as the start/stop synchronizers shown in FIG. 2.

While power-on and system reset circuits are well known, the start and stop signals 221 and 222 used to set and reset at least latch 325 are generated by event detection and synchronization circuitry such as that shown in FIG. 4. The start and stop signals 221 and 222 are additionally used in one embodiment to set and reset all state latches of the slave controller state machine 225 in order to properly initialize the state machine 225 after a start or stop event.

The asynchronous start detect circuit 210 receives ICLK 251 and DATA 152 and generates the asynchronous start signal (ASTART) 211. An AND gate 405 has an active low input coupled to receive DATA 152 and a second input coupled to receive the output of an OR gate 410. The OR gate 410 has an active low input coupled to receive ICLK 251, an input coupled to receive the output of the AND gate 405, and an active low input coupled to receive an active low power-on reset signal (RESET). A NAND gate 415 has one input coupled to receive ICLK 251, one active low input coupled to receive the output of the OR gate 410, and another active low input coupled to receive DATA 152. The NAND gate 415 has as its output the asynchronous start signal.

The asynchronous stop detect circuit 215 also is coupled to receive ICLK 251 and DATA 152. An AND gate 420 has one input coupled to receive DATA 152 and a second input to receive an output of an OR gate 425. The OR gate 425 has an active low input coupled to receive ICLK 251, an input coupled to receive the output of the AND gate 420, and an active low input coupled to receive RESET. A NAND gate 430 has one input coupled to receive the bus clock signal, an active low input coupled to receive the output of the OR gate 425, and an input coupled to receive the data signal. The NAND gate 430 generates the asynchronous stop signal.

The start/stop synchronization logic 220 includes a first latch 440 and a second latch 450. The asynchronous start signal (ASTART) 211 is coupled to a reset input of the first latch 440 and coupled to a first input of an AND gate 445. A second input of the AND gate 445 is coupled to receive the active low power-on reset signal (RESET), and the output of the AND gate 445 is coupled to a set input of the second latch 450.

The asynchronous stop signal (ASTOP) 216 is coupled to a reset input of the second latch 450 and coupled to the first input of an AND gate 435. A second input of the AND gate 435 is coupled to receive RESET, and the output of the AND gate 435 is coupled to a set input of the first latch 440. Both the first latch 440 and the second latch 450 have a data input coupled to a logical high level and a clock input coupled to the slave clock signal. An output of the first latch 440 generates the start signal, and an output of the second latch 450 generates the stop signal.

Figure 5:
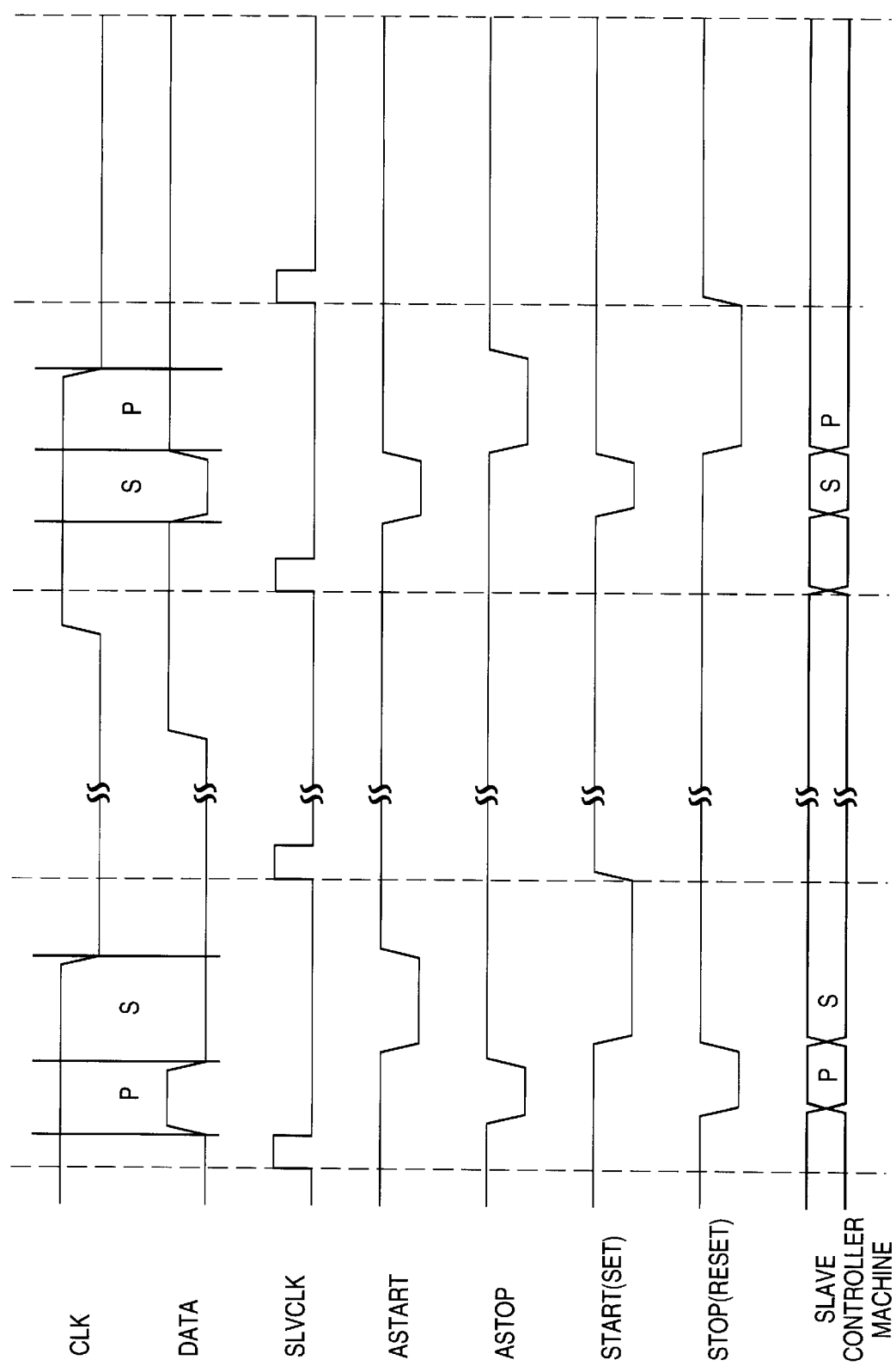
FIG. 5 is a timing diagram demonstrating the operation of start and stop detection and synchronization of FIG. 4.

Operation of the start/stop synchronization and detection circuitry of FIG. 4 is illustrated by the waveforms found in FIG. 5. At some point during an initialization period, the power-on reset signal (RESET) is asserted low causing the latches 440 and 450 to be set. RESET also causes the OR gates 410 and 425 to drive their respective outputs high. As a result, the synchronous start and stop signals and the asynchronous start and stop signals are all deasserted.

A first stop period (P) begins when DATA 152 transitions from a low to a high level. This causes ASTOP 216 to be asserted by the NAND gate 430. The asynchronous stop signal 216 being asserted low forces the latch 450 to be reset, asserting low STOP 222. The asynchronous stop assertion also forces the latch 440 to be set through the AND gate 435 and ensures that START 221 is deasserted. The stop signal 222 forces the state machine 225 to a stop state where it would remain if the data signal 152 did not transition again before the fall of the clock signal.

In this case, however, DATA 152 transitions back from the high level to the low level causing the NAND gate 415 to assert low ASTART 211. This immediately sets the latch 450 through AND gate 445 thereby deasserting ASTOP 216. ASTART 211 also resets the latch 440, asserting START 221 and causing the state machine to enter a start (S) state.

Thus, the start/stop synchronization logic 220 in conjunction with the asynchronous start detect circuit 210 and the asynchronous stop detect circuit 215 tracks the sequence of both start and stop events occurring between slave clock cycles. The deassertion of the stop signal 222 occurs asynchronously and before the deassertion of the start signal 221 to mirror the order of the actual start and stop events. The deassertion of the start signal 221 is synchronous and preserves the temporal order of the actual asynchronous events. Accordingly, the start signal 221 can be used as a set signal to properly force the synchronous state machine 225 into a start state.

FIG. 5 also illustrates the sequence of events occurring when a start transition is followed by a stop transition. When DATA 152 transitions low ASTART 211 is asserted by the NAND gate 415. As previously the assertion ASTART 211 results in the assertion of START 221 and the deassertion of STOP 222. In this case, a second start (S) state is entered. When DATA 152 transitions to the high level this signifies a stop event and ASTOP 216 is asserted by the NAND gate 430. At this point, START 221 is deasserted as the latch 440 is set. Additionally, STOP 222 is asserted and a second stop (P) state entered as the latch 450 is reset. Again, the sequence of start and stop events is preserved in the deassertion edges of the start and stop signals 221 and 222 and the stop signal 222 can be used to force the state machine into a stop state.

Thus, the clock rate compensation circuitry of the present invention employs asynchronous event detection, sequence preservation, clock stretching, and synchronization. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A slave device coupled to a bus transferring information at a first operating frequency, the slave device comprising:
   a bus clock driver circuit coupled to a bus clock interface for a bus clock signal;
   a state machine clocked by a slave clock signal which has a slave clock frequency less than the first operating frequency; and
   a clock rate compensation circuitry coupled to receive the bus clock signal, a data signal, and the slave clock signal, the clock rate compensation circuitry being coupled to synchronize bus events for the state machine and being coupled to the bus clock driver circuit to asynchronously begin a bus clock signal stretching period, the clock rate compensation circuitry comprising a clock stretch circuit having a synchronous clock stretch output coupled to cause a synchronous termination of the bus clock signal stretching period.

2. The slave device of claim 1 wherein the synchronous clock stretch output is coupled to the state machine and the state machine is coupled to synchronously terminate the bus clock signal stretching period after at least one clock cycle of the slave clock signal.

3. The slave device of claim 2 wherein the clock stretch circuit has an asynchronous clock stretch output coupled to begin the bus clock signal stretching period and the state machine has a remove stretch output coupled to deassert the asynchronous clock stretch output.

4. The slave device of claim 1 wherein the clock stretch circuit begins the bus clock signal stretching period in response to a bus clock transition to a first logic level and drives the bus clock signal to the first logic level during the bus clock signal stretching period.

5. The slave device of claim 1 wherein the clock rate compensation circuitry comprises a start/stop detector and synchronizer coupled to receive the data signal and the bus clock signal and to generate a synchronous start signal and a synchronous stop signal for the state machine.

6. The slave device of claim 1 wherein the clock rate compensation circuitry comprises:
   a clock stretch circuit coupled to generate, in response to a first bus clock transition, an asynchronous clock stretch signal for the bus clock driver circuit and a synchronous clock stretch signal for the state machine;
   a start/stop detector and synchronizer coupled to receive the data signal and the bus clock signal and to generate a synchronous start signal and a synchronous stop signal for the state machine.

7. The slave device of claim 6 further comprising:
   an edge detect circuit coupled to detect a second bus clock transition and to couple a synchronous edge detect signal to the state machine.

8. The slave device of claim 1 wherein the slave device is a slave controller in a secondary bus bridge, the bus is a system management bus, the bus clock interface is coupled to a system management bus clock line, the data signal is a serial data signal from the system management bus, and wherein the slave clock signal is derived from a real time clock signal.

9. A computer system comprising:
   a processor;
   a memory;
   a system bus coupled to the processor and the memory;
   a secondary bus having a data line and a bus clock line for a bus clock signal;
   a secondary bus device coupled to the secondary bus and having a first operating frequency;
   a secondary bridge coupling the secondary bus to the system bus, the secondary bridge including a slave controller coupled to receive a data sequence from the secondary bus, the slave controller having a slave controller clock signal which is independent of the bus clock signal and which has an operating frequency which is less than the first operating frequency; and
   a real time clock source continuously enabled during system operation to produce a real time clock signal from which the slave controller clock signal is derived.

10. The computer system of claim 9 wherein the slave controller further comprises:
    a resume event detect circuit coupled to the secondary bus to generate a resume signal to awaken the computer system if the data sequence presents a resume event.

11. The computer system of claim 9 wherein the slave controller comprises:
    event synchronization logic coupled to the secondary bus to synchronize events on the secondary bus to the slave controller clock signal;
    clock stretch logic coupled to asynchronously begin to stretch the bus clock signal.

12. A clock rate compensation circuit receiving a slave clock signal and having a bus clock interface for a bus clock signal, the clock rate compensation circuit comprising:
    a clock stretch circuit coupled to drive an asynchronous clock stretch signal and a synchronous clock stretch signal in response to a transition of the bus clock signal to a first signal level, the synchronous clock stretch signal being synchronized to the slave clock signal;
    a clock driver circuit coupled to drive the bus clock interface to the first signal level thereby stretching the bus clock signal in response to either of the asynchronous clock stretch signal and the synchronous clock stretch signal.

13. The clock rate compensation circuit of claim 12 wherein the clock driver circuit is coupled to receive a slave stretch clock signal and responsively stretch the bus clock signal, the slave stretch clock signal being generated by a state machine in response to the synchronous clock stretch signal.

14. The clock rate compensation circuit of claim 12 wherein the clock stretch circuit is coupled to be reset by a remove stretch signal from a state machine.

15. The clock rate compensation circuit of claim 14 wherein the clock stretch circuit comprises:
    a first latch having a first latch clock input coupled to receive the bus clock signal, the first latch generating the asynchronous clock stretch signal in response to the transition of the bus clock signal.

16. The clock rate compensation circuit of claim 15 further comprising:

a second latch having a second latch clock input coupled to receive the slave clock signal and having a second latch data input and a second latch data output coupled to synchronize the asynchronous clock stretch signal to generate the synchronous clock stretch signal.

17. The clock rate compensation circuit of claim 12 further comprising:

a rising edge detect circuit coupled to receive the slave clock signal and the bus clock signal, the rising edge detect circuit having a synchronous clock rise output coupled to a state machine clocked by the slave clock signal.

18. The clock rate compensation circuit of claim 17 wherein the rising edge detect circuit comprises:

a first latch coupled to receive the bus clock signal and generate a clock rise signal in response to a rising transition of the bus clock signal;

a second latch coupled to receive the clock rise signal and the slave clock signal and drivingly coupled to the synchronous clock rise output; and a third latch coupled to receive the clock rise signal and the slave clock signal and coupled to reset the first latch in response to a synchronous clock rise signal on the synchronous clock rise output.

19. The clock rate compensation circuit of claim 12 wherein the clock rate compensation circuit has a data interface for a data signal and further comprises:

an asynchronous start detect circuit coupled to receive the bus clock signal and the data signal and to generate an asynchronous start signal;

an asynchronous stop detect circuit coupled to receive the bus clock signal and the data signal and to generate an asynchronous stop signal;

a start/stop synchronizer circuit coupled to receive the asynchronous start signal, the asynchronous stop signal, and the slave clock signal, the start/stop synchronizer circuit generating a synchronous start signal and a synchronous stop signal.

20. A clock rate compensation circuit receiving a slave clock signal and having a bus clock interface for a bus clock signal and a data interface for a data signal, the clock rate compensation circuit comprising:

an asynchronous start detect circuit coupled to receive the bus clock signal and the data signal and to generate an asynchronous start signal;

an asynchronous stop detect circuit coupled to receive the bus clock signal and the data signal and to generate an asynchronous stop signal;

a start/stop synchronizer circuit coupled to receive the asynchronous start signal, the asynchronous stop signal, and the slave clock signal, the start/stop synchronizer circuit generating a synchronous start signal and a synchronous stop signal, the synchronous start signal and the synchronous stop signal being synchronous to the slave clock signal.

21. The clock rate compensation circuit of claim 20 wherein the asynchronous start detect circuit provides the asynchronous start signal in response to a first transition of the data signal and the asynchronous stop signal in response to a second transition of the data signal.

22. The clock rate compensation circuit of claim 20 the asynchronous start signal and the asynchronous stop signal have a known temporal relation which is preserved in the synchronous start signal and the synchronous stop signal.

23. The clock rate compensation circuit of claim 22 wherein the known temporal relation is preserved in a deassertion edge of the synchronous start signal and the synchronous stop signal.

24. A method of compensating for a slave device operating with a slave clock signal having a lower frequency than other devices on a bus, the method comprising the steps of:

detecting a transition of a clock signal to a first signal level;

driving asynchronously the clock signal to the first signal level;

synchronizing the transition to the slave clock signal, the slave clock signal being derived from a real time clock signal that is continuously enabled during system operation; and releasing synchronously the clock signal.

25. The method of claim 24 further comprising the steps of:

detecting a start condition on the bus;

synchronizing the start condition to the slave clock signal;

detecting a stop condition on the bus;

synchronizing the stop condition to the slave clock signal; and preserving a temporal relation between the start condition and the stop condition.

26. The method of claim 24 further comprising the steps of:

detecting a second transition of the clock signal to a second signal level; and synchronizing the second transition to the slave clock signal.

27. The method of claim 24 further comprising, before the step of releasing, the steps of:

passing a synchronous clock stretch signal to a slave state machine; and generating a slave stretch clock signal; and generating a remove stretch signal to terminate the asynchronous driving of the clock signal.

28. The method of claim 25 wherein the step of detecting the start condition further comprises the steps of:

testing whether the clock signal is at a second logic level;

detecting a start transition on a data line.

* * * * *

UNITED STATES PATENT AND TRADEMARK OFFICE
CERTIFICATE OF CORRECTION

PATENT NO.    : 5,925,135
DATED         : July 20, 1999
INVENTOR(S)   : Trieu et al.

It is certified that error appears in the above-identified patent and that said Letters Patent is hereby corrected as shown below:

Column 3,
Line 37, delete "lo".

Signed and Sealed this

Twenty-ninth Day of April, 2003

JAMES E. ROGAN
*Director of the United States Patent and Trademark Office*